(12) United States Patent
Todasco

(10) Patent No.: US 10,275,733 B2
(45) Date of Patent: Apr. 30, 2019

(54) DELIVERY CONFIRMATION USING A WIRELESS BEACON

(71) Applicant: PAYPAL, INC., San Jose, CA (US)

(72) Inventor: Michael Charles Todasco, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 708 days.

(21) Appl. No.: 14/460,741

(22) Filed: Aug. 15, 2014

(65) Prior Publication Data

US 2016/0048796 A1 Feb. 18, 2016

(51) Int. Cl.
G06Q 10/08 (2012.01)
H04W 12/06 (2009.01)
H04W 4/80 (2018.01)

(52) U.S. Cl.
CPC .......... *G06Q 10/083* (2013.01); *H04W 4/80* (2018.02); *H04W 12/06* (2013.01)

(58) Field of Classification Search
CPC .............................. G06Q 10/083; H04W 4/80
See application file for complete search history.

(56) References Cited

U.S. PATENT DOCUMENTS

| | | | | |
|---|---|---|---|---|
| 2006/0026030 A1* | 2/2006 | Jacobs | ............... | G06Q 10/025 705/26.1 |
| 2007/0290836 A1* | 12/2007 | Ainsworth | ............. | G06Q 10/08 340/539.13 |
| 2012/0130916 A1* | 5/2012 | Neal | .................. | G06Q 10/08 705/339 |
| 2012/0246077 A1* | 9/2012 | Skaaksrud | ......... | G06Q 30/0615 705/50 |
| 2012/0284191 A1* | 11/2012 | Scipioni | ................ | G06Q 10/08 705/44 |
| 2013/0003660 A1* | 1/2013 | Zhong | .................. | H04W 88/04 370/328 |
| 2013/0332308 A1 | 12/2013 | Linden et al. | | |
| 2014/0279596 A1* | 9/2014 | Waris | .................. | G06Q 10/083 705/317 |
| 2015/0145650 A1* | 5/2015 | Levan | ............... | G06Q 10/0833 340/10.1 |

OTHER PUBLICATIONS

Ding et al., A Low-Power Multi-Radio Wireless Network for Mobile Asset Tracking, Sep. 1, 2012, 2012 IEEE Vehicular Technology Conference (VTC Fall) (Year: 2012).*

* cited by examiner

*Primary Examiner* — Michael P Harrington
*Assistant Examiner* — Rupangini Singh
(74) *Attorney, Agent, or Firm* — Haynes and Boone, LLP

(57) ABSTRACT

There are provided systems and methods for delivery confirmation using wireless beacons. A merchant may include a wireless beacon, such as a small token or device, inside of a package for delivery. The beacon may communicate with a user device for a user when the package is delivered to the user. The beacon may include recipient information of eligible recipients for the package. The beacon may receive identification information for the user when the user device connects to the beacon. A delivery person in possession of the package may then determine if the user is an eligible recipient for the package using the recipient information and the identification information. After delivery of the package, the user may reuse the beacon by erasing the recipient information from the beacon and storing new recipient information on the beacon. The user may then place the beacon in another package for delivery.

20 Claims, 6 Drawing Sheets

DELIVERY CONFIRMATION USING A WIRELESS BEACON

TECHNICAL FIELD

The present application generally relates to delivery confirmation using wireless beacons and more specifically to placing a small wireless device in a package for delivery that assists the delivery person in identifying proper recipients for the package.

BACKGROUND

A merchant may offer delivery of packages to users through delivery service providers that offer delivery of items to a purchaser's home or office. When a user purchases an item, they may provide delivery information, such as an address and name, of a recipient for the package. Thus, when delivering an item, a delivery person may match the delivery information to the address and person receiving the package. If the person receiving the package does not match the delivery information, the delivery person may not release the package to the person. At other times, a user may be away from home at the time the delivery person arrives with a package and may ask another person, such as a spouse, child, or roommate to take delivery of the package. In some instances, this may cause the delivery person may release the package to an incorrect person. For example, a delivery person and/or shipping company may add a signature requirement to receipt of packages. However, the signature may be forged or omitted in various circumstances. Thus, the user may not receive their package from the merchant, incurring costs to the merchant, the delivery service provider, and/or an insurance provider.

Figure 1:
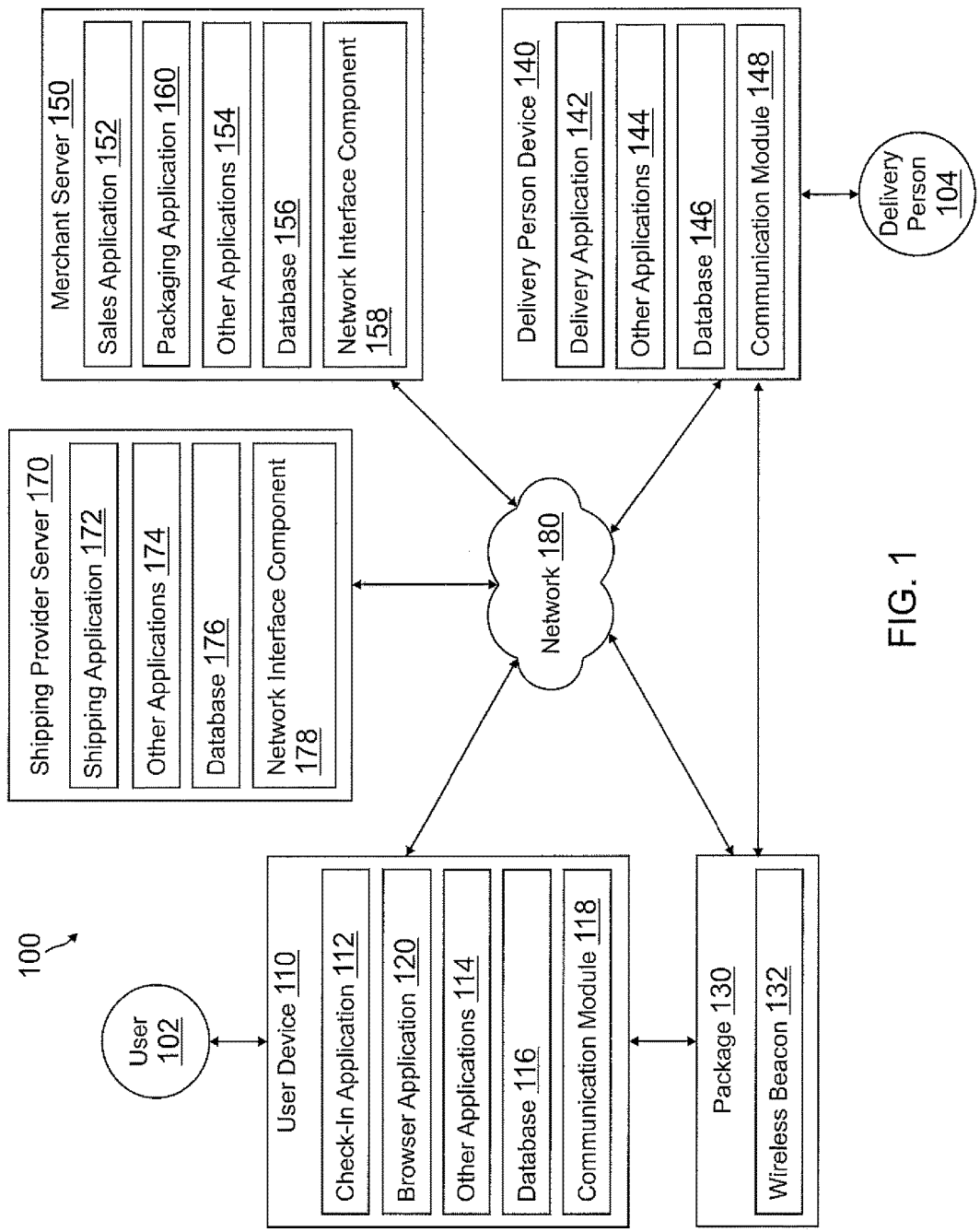
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide delivery confirmation using wireless beacons. Systems suitable for practicing methods of the present disclosure are also provided.

Various merchants may provide wireless beacons that utilize short range wireless communications with a device, such as using Bluetooth Low Energy (BLE), LTE Direct, or other communication protocol. These beacons may be added to a package for delivery. The beacons may communicate with devices in possession of a user to receive identification information and/or check-in information for the user. The beacons may provide additional functionality, such as establishing a connection with a delivery device for a delivery person in possession of the package. The beacons may also store information, including recipient information for the package.

A merchant may sell items to users online or through phone communications. The merchant may further provide delivery of the items using a delivery service. The merchant and/or delivery service may offer communication and check-in through one or more short range wireless beacons placed inside the package. These beacons may utilize short range wireless communications to communicate with a device in possession of the user. The beacons may employ Bluetooth Low Energy (BLE), LTE Direct, or another communication protocol to emit a communication signal receivable by the user's device. The communication may include an identifier for the beacon, the user, the merchant, and/or the delivery service administering the beacons.

The user's device may be set up to passively monitor for BLE communications. When the device detects the signal and verifies the one or more identifiers, both the device and the beacon may ramp up in power and establish a connection, where the connection may further enable the device to communicate with the delivery service's delivery person. Thus, the beacon enables the user's device to establish a connection, communicate check-in information (e.g., an identifier or other identification information for the user), and/or verify the user is authorized to receive the package. The connection may be completed automatically when the user's device is in range of the beacon, or may be completed after prompting the user to connect with the beacon when the user's device is in range of the beacon.

Thus, the wireless beacon may connect to the user's device when the device is in proximity to the wireless beacon. For example, a wireless beacon may broadcast an identifier, which, when received, may initiate a connection with a device within an area around the wireless beacon. Thus, as the user's device enters that area, the device may connect to the wireless beacon and/or initiate the connection. The wireless beacon(s) may be range limited to correspond to the package for delivery that the beacon is placed in, such as by limiting the signal strength of the beacon.

Once the user's device connects to the beacon, the beacon may receive identification information for the user. The wireless beacon may include recipient information for eligible persons to receive the package. In other embodiments, the identification information for the user may be transmitted to a server having the recipient information. Using the identification information for the user and the recipient information, a determination may be made of whether the user having the user device is eligible to receive the package. The recipient information may identify the user as eligible to receive the package, such as the purchaser of the item or other users that may receive the package (e.g., a spouse, child, or other person known to the user). In other embodiments, the recipient information and the identification information are used to determine a relationship between the users identified in the recipient information and the user for the identification information. If the user commonly co-locates or has a transaction history with one or more of the users identified in the recipient information, the user may receive the package. The recipient information may also have a list of blacklisted users ineligible to receive the package. In additional embodiments, the identification information may be added to a blacklist, such as if the person has previously taken a package that didn't belong to them.

Once the package is received, the wireless beacon may be reused by the user in another package. The package may include access information to access the wireless beacon and erase the recipient information. The user may then reprogram the wireless beacon with new recipient information. In other embodiments, the new recipient information may be provided to a server, such as corresponding to a delivery service provider. The user may then place the wireless beacon in another package and ship the package. Thus, when the package arrives at another destination for delivery, the wireless beacon may connect with another user's device at the destination and a determination may be made of whether the other user may receive the package.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a delivery person 104, a user device 110, a package 130 having a wireless beacon 132, a delivery person device 140, a merchant server 150, and a shipping provider server 170 in communication over a network 180. User 102, such as a consumer, may purchase an item from a merchant corresponding to merchant server 150. The merchant may utilize shipping provider server 170 to ship package 130 having wireless beacon 132. Wireless beacon 132 may then connect to user device 110 when the package arrives at a destination and a determination may be made of whether user 102 can receive package 130. The determination may be sent to delivery person device 140 for viewing by delivery person 104.

User device 110, wireless beacon 132, delivery person device 140, merchant server 150, and a shipping provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

User device 110 may be implemented using any appropriate hardware and software configured for wired and/or wireless communication with wireless beacon 132, delivery person device 140, merchant server 150, and/or shipping provider server 170. For example, in one embodiment, user device 110 may be implemented as a personal computer (PC), a smart phone, laptop computer, wristwatch with appropriate computer hardware resources, eyeglasses with appropriate computer hardware (e.g. GOOGLE GLASS®), or other wearable computing device, a computing device mounted within a vehicle (e.g., a console or heads up display computing device in a vehicle), and/or other types of computing devices capable of transmitting and/or receiving data, such as an IPAD® from APPLE®. Although a user device is shown, the user device may be managed or controlled by any suitable processing device. Although only one user device is shown, a plurality of user devices may function similarly.

User device 110 of FIG. 1 contains a check-in application 112, a browser application 120, other applications 114, a database 116, and a communication module 118. Check-in application 112, browser application 120, and other applications 114 may correspond to processes, procedures, and/or applications executable by a hardware processor, for example, a software program. In other embodiments, user device 110 may include additional or different software as required.

Check-in application 112 may be used by user 102 of user device 110 to establish a connection with wireless beacon 132. Check-in application 112 may correspond to a specific application utilized by user device 110 with wireless beacon 132. In various embodiments, check-in application 112 may receive short range wireless communications from wireless beacon 132 when package 130 is in proximity to user device 110 and transmit information to wireless beacon 132, including identification information and/or check-in information (e.g., an identifier for user 102 and/or user device 110) for a check-in process that associates user 102 with wireless beacon 132. Wireless beacon 132 may be range limited to connect only with devices (e.g., user device 110) within a specified area, such as a radius around wireless beacon 132. In various embodiments, wireless beacon 132 may be place inside, on, or connected to package 130, as will be explained in more detail herein. Thus, user device 110 may connect to wireless beacon 132 when user device 110 is within a distance or radius around package 130. Based on the proximity for connection to wireless beacon 132, check-in application 112 may transmit information to wireless beacon 132 when user 102 is nearby wireless beacon 132, enabling delivery person device 140 to determine that user 102 is located in proximity to wireless beacon 132 (and thus may determine if user 102 holding user device 110 is eligible to receive package 130).

Check-in application 112 may execute in the background of an operating system of user device 110 and be configured to establish connections, using communication module 118 of user device 110, with wireless beacon 132. The connection may be established with or without user input from user 102. For example, wireless beacon 132 may broadcast a token, such as a universally unique identifier (UUID), for reception by check-in application 112, as will be explained in more detail herein. Check-in application 112 may utilize communication module 118 of user device 110 to receive the token from wireless beacon 132. If check-in application 112 acknowledges the UUID as identifying wireless beacon 132, delivery person device 140, merchant server 150, and/or shipping provider server 170 (e.g., if check-in application 112 determines the UUID corresponds to a request to establish a communication channel and/or process and complete a check-in), check-in application 112 may transmit an identifier or other identification information corresponding to user 102 and/or user device 110 back to wireless beacon 132. Check-in application 112 may utilize communication module 118 of user device 110 to communicate with wireless beacon 132 (e.g., over near field communication, Bluetooth, Bluetooth Low Energy, radio, infrared, LTE Direct, or other communication protocol). The identifier from user device 110 may include, be transmitted with, concatenated with, or otherwise bundled with the identifier received from wireless beacon 132. In other embodiments, different information may be transmitted to wireless beacon 132, such as a name or other personal information for user 102 or other identifying information. Thus, the information transmitted to wireless beacon 132 does not need to be utilized to process and/or complete a check-in with delivery person device 140 in all embodiments and may be used to establish a connection and determine whether user 102 can receive package 130. Thus, once a connection is established with wireless beacon 132, a determination may be made of whether user 102 is eligible to receive package 130 using the identification information for user 102 and/or user device 110.

Browser application 112 may be used, for example, to provide a convenient interface to permit user 102 to browse the Internet, including navigation to websites and between webpages of websites. Browser application 112 may therefore be configured to transmit and receive information, such as webpage requests, input to webpages, downloads and uploads of data in database 116 of user device 110, etc. In various embodiments, browser application 112 may be used to reprogram wireless beacon 132 with new recipient information for a package using one or more of merchant server 150 and/or shipping provider server 170, as will be explained in more detail herein. Thus, user 102 may utilize browser application 112 to enter information to merchant server 150 and/or shipping provider server 170, such as access information provided for wireless beacon 132 and/or the new recipient information (e.g., identification information for eligible receivers of a new package that user 102 is shipping). The access information may be provided in package 130, as will be explained in more detail herein.

In various embodiments, one or more features of check-in application 112 and browser application 120 may be incorporated in the same application so as to provide their respective features in a similar application.

User device 110 includes other applications 114 as may be desired in particular embodiments to provide features to user device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with shipping provider server 170. Other applications 114 may include browser, social networking, and/or mapping applications. Other applications 114 may also be used in conjunction with check-in application 112 and/or browser application 120 in order to facilitate delivery confirmation using wireless beacon 132 and provide recipient information when reusing wireless beacon 132. Other applications 114 may contain software programs, executable by a processor, including a graphical user interface (GUI) configured to provide an interface to the user.

User device 110 may further include database 116 which may include, for example, identifiers such as operating system registry entries, cookies associated with check-in application 112, browser application 120, and/or other applications 114, identifiers associated with hardware of user device 110, or other appropriate identifiers, such as identifiers used for user/device identification. Identifiers in database 116 may be transmitted to wireless beacon 132 as identification information and/or check-in information for user 102 and/or user device 110. Database 116 may include user device tokens and/or encryption keys, including an encryption key of wireless beacon 132, delivery person device 140, merchant server 150, and/or shipping provider server 170. Database 116 may include identifying information for tokens enabling check-in application 112 to identify wireless beacon 132, delivery person device 140, merchant server 150, and/or shipping provider server 170 when receiving a corresponding token. In various embodiments, database 116 may store information used by browser application 120 to reprogram wireless beacon 132 with new recipient information, such as access information to wireless beacon 132 and/or the new recipient information.

User device 110 includes at least one communication module 118 adapted to communicate with wireless beacon 132, delivery person device 140, merchant server 150, and/or shipping provider server 170. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacon 132 using short range communications, such as Bluetooth Low Energy, LTE Direct, WiFi, radio frequency, infrared, Bluetooth, and near field communications.

Package 130 may correspond to a physical item or container for delivery to a user, such as user 102. Thus, package 130 may include shipping containers, packages, and/or other objects used to ship and deliver an item to the user. Package 130 may further include wireless beacon 132, which may be located inside, attached to, or connected to package 130. Wireless beacon 132 may include hardware and software necessary to execute the processes and functions as described below. In other embodiments, package 130 may include additional hardware and/or software as required to process the above and below described features offered by package 130.

Wireless beacon 132 may be maintained, for example, by a merchant corresponding to package 130/merchant server 150 or by a shipping provider corresponding to shipping provider server 170. Wireless beacon 132 may be implemented using any appropriate hardware and software configured for wireless communication with user device 110. For example, wireless beacon 132 may act as a stand-alone device including a processor, communication module, and/or network interface component configured to communicate with user device 110 and/or shipping provider server 170. Wireless beacon 132 may be limited, either by signal range or physical boundaries, to package 130.

Wireless beacon 132 of FIG. 1 contains processes, procedures, and/or applications, for example, a software program, executable by a hardware processor configured to interact with user device 110, delivery person device 140, merchant server 150 and/or shipping provider server 170. Thus, regardless of the implementation of wireless beacon 132 as discussed above, wireless beacon 132 may utilize a connection/check-in process and include or be connected to a communication module. In other embodiments, wireless beacon 132 may include additional or different hardware and software as required.

Wireless beacon 132 may include an application for transmitting requests to establish a connection between a device (e.g., user device 110) and wireless beacon 132. The requests may be unique to wireless beacon 132, thereby identifying wireless beacon 132. Wireless beacon 132 may utilize short range wireless communications of wireless beacon 132 to transmit the requests to establish a connection, including an identifier such as a Universally Unique Identifier (UUID). If user device 110 receives a request to establish the connection with wireless beacon 132 and responds with an identifier for user 102/user device 110 (potentially including the UUID and other information necessary to effectuate a check-in for user 102), wireless beacon 132 may ramp up in power and create a connection between user device 110 and wireless beacon 132.

Wireless beacon 132 may transmit the request to establish the connection with wireless beacon 132 as a short range wireless communication (e.g. a BLE protocol communication) including a "wake up" process for check-in application 112 of user device 110 and/or a token for wireless beacon 132 transmitting the request. In other embodiments, the request and/or connection may utilize near field communication, radio communication, infrared communication, or Bluetooth communication. Additionally, although wireless beacon 132 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacon 132 (e.g., user device 110) and establishment of a connection for data transfers. In other embodiments, wireless beacon 132 may correspond to other devices, such as WiFi capable devices, near field communication devices, etc.

The request may be specific to user device 110 by including information that is specific to user 102/user device 110, such as a name, identifier, or user device identifier. The information specific to user 102/user device 110 may be determined from a user account of user 102 or other information previously provided to merchant server 150 and/or shipping provider server 170 (e.g., an identifier for user 102 provided to merchant server 150 and/or shipping provider server 170). Thus, in certain embodiments, only user device 110 will pick up and authenticate the request, for example, if user 102 order package 130 from merchant server 150.

After wireless beacon 132 receives an identifier or other identification information from user device 110, wireless beacon 132 may determine user 102 is in proximity to wireless beacon 132, and, thus, package 130. In various embodiments, wireless beacon 132 may store recipient information and utilize the identification information to determine if user 102 is eligible/entitled to receive package 130. In other embodiments, wireless beacon 132 may pass the identification information to merchant server 150 and/or shipping provider server 170 to associate user 102 with the wireless beacon 132 and determine whether user 102 is eligible to receive package 130 utilizing stored recipient information.

The recipient information may be determined by merchant server 150 and/or shipping provider server 170 when first adding wireless beacon 132 to package 130. The recipient information may include one or more valid users to receive package 130. Thus, the recipient information may be determined on checkout of a purchase with merchant server 150 or when entering shipping information to shipping provider server 170. The recipient information may only let the user or users within the recipient information receive package 130, or may allow trusted users/devices associated with the user/users in the recipient information to also receive package 130. In various embodiments, the trusted users/devices may depend on a relational score between one or more of the users listed in the recipient information and the identification information for the user/device received by wireless beacon 132. The user/users in the recipient information may be identified by their identification information, such as an identifier or identifiers, user name/image/address, or other identification information.

In order to determine whether user 102 is eligible to receive package 130, the identification information received by wireless beacon 132 may be compared to the recipient information to determine if the identification information is in the recipient information. If the identification information for user 102/user device 110 is contained within the recipient information, then it may be determined that user 102 may receive package 130. However, if the identification information is not contained within the recipient information, user 102 may be ineligible to receive package 130. In other embodiments, if the identification information is not contained in the recipient information, a relational score between the identification information received for user 102/user device 110 and one or more of the identification information contained in the recipient information may be determined. The relational score may be a trust score based on one or more of co-locating features between users and/or user devices, transaction histories between user devices, and/or account sharing characteristics of user devices. The relational score may be required to be a certain number/factor (e.g., 80%) in order for a determination to be made that user 102 may receive the package. The relational score's required threshold may be affected by insurance costs for package 130. In certain embodiments, the identification information may be added to a blacklist that is always ineligible to receive package 130 even if the relational score is high enough, such as a neighbor or a user previously receiving a package fraudulently.

As previously discussed, wireless beacon 132, merchant server 150, and/or shipping server 170 may determine whether user 102 is eligible to receive package 130 using the identification information and the recipient information. Once the determination has been made, the determination may be sent to delivery person device 140 for viewing by delivery person 104. Thus, delivery person 104 may receive a notification of whether to release package 130 to user 102. If package 130 is released to user 102, wireless beacon 132 may be reused by user 102 when shipping another package. Thus, package 130 may include access information for wireless beacon 132 that may be utilized to erase the old recipient information from wireless beacon 132, merchant server 150, and/or shipping provider server 170 and enter new recipient information to wireless beacon 132, merchant server 150, and/or shipping provider server 170. The access information may correspond to a card, sticker, or other item inserted into package 130. The access information may also be received from merchant server 150 and/or shipping provider server 170 (e.g., through a user account, email, text, message, etc.). The new recipient information entered by user 102 may include a list of identification information for eligible receivers of a new package, whether trusted devices may also receive the new package, a relational score threshold for trusted devices, and/or blacklisted devices. User 102 may the place wireless beacon 132 in or connected to the new package when shipping the package for delivery.

Wireless beacon 132 may utilize a communication module to pass the identification information and/or determination on whether user 102 is eligible to receive package 130 to delivery person device 140, merchant server 150, and/or shipping provider server 170. Thus, wireless beacon 132 includes a communication module adapted to communicate with user device 110, delivery person device 140, merchant server 150 and/or shipping provider server 170. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacon 132 may also communicate with user device 110 and/or delivery person device 140 using short range communications, such as Bluetooth Low Energy, LTE Direct, WiFi, radio frequency, infrared, Bluetooth, and near field communications.

Delivery person device 140 may correspond to a device used by delivery person 104 to receive a determination of whether user 102 may receive package 130. Delivery person 104 may correspond to an employee of shipping provider server 170 who may deliver package 130 to a location specified in delivery instructions for package 130. Thus, delivery person device 140 may be located locally to package 130, such as on the person of delivery person 104. Delivery person device 140 may be implemented using any appropriate hardware and software configured for wired and/or wireless communication with user device 110, wireless beacon 132, merchant server 150, and/or shipping provider server 170. For example, delivery person device 140 may be implemented as a personal computer (PC), a smart phone, laptop computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a device is shown, the device may be managed or controlled by any suitable processing device. Although only one device is shown, a plurality of devices may function similarly.

Delivery person device 140 of FIG. 1 contains a delivery application 142, other applications 144, a database 146, and a communication module 148. Delivery application 142 and other applications 144 may correspond to processes, procedures, and/or applications, for example, a software program, executable by a hardware processor. In other embodiments, delivery person device 140 may include additional or different software as required.

Delivery application 142 may correspond to an application having an interface where delivery person 104 may receive and view notification and/or determinations of whether user 102 is eligible to receive package 130 after wireless beacon 132 receives identification information for user 102/user device 110. In various embodiments, the identification information may be provided to delivery person device 140 to make the determination. Thus, in such embodiments, delivery person device 140 may store recipient information for package 130 and delivery application 142 may make the determination using the identification information and the recipient information. However, and as previously discussed with reference to wireless beacon 132, in other embodiments, wireless beacon 132, merchant server 150, and/or shipping provider server 170 may make the determination. Once the determination has been made, the determination (e.g., a notification) may be sent to delivery application 142 for viewing by delivery person 104. Delivery application 142 may then inform delivery person 104 of whether delivery person 104 may release package 130 to user 102.

Delivery person device 140 includes other applications 144 as may be desired in particular embodiments to provide features to delivery person device 140. For example, other applications 144 may include security applications for implementing client-side security features, programmatic client applications for interfacing with appropriate application programming interfaces (APIs) over network 180, or other types of applications. In various embodiments, other applications 144 may include shipping and/or payment application associated with shipping provider server 170. Other applications 144 may contain other software programs, executable by a processor, including a graphical user interface (GUI) configured to provide an interface to the user.

Delivery person device 140 may further include database 146 which may include, for example, identifiers such as operating system registry entries, cookies associated with delivery application 142 and/or other applications 144, identifiers associated with hardware of delivery person device 140, or other appropriate identifiers, such as identifiers used for user/device authentication or identification. Database 146 may also store user 102's identification information, including check-in information, an identifier, etc., for user 102, and any other users associated with user 102 while ordering with user 102. Database 146 may include recipient information in the embodiments where delivery person device 140 determines if user 102 is eligible to receive package 130. Additionally, the determinations and/or related notifications may be stored to database 146.

Delivery person device 140 includes at least one communication module 148 adapted to communicate with user device 110, wireless beacon 132, merchant server 150 and/or shipping provider server 170. In various embodiments, communication module 148 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 148 may communicate directly with wireless beacon 132 using short range communications, such as Bluetooth Low Energy, LTE Direct, radio frequency, infrared, Bluetooth, and near field communications.

Merchant server 150 may be maintained, for example, by a merchant or other online retailer, which may provide item sales and delivery to user, such as user 102. In this regard, merchant server 150 includes one or more processing applications which may be configured to interact with user device 110, wireless beacon 132, delivery person device 140, and/or shipping provider server 170 to facilitate sales and delivery of items. In one example, merchant server 150 may be provided by EBAY®, Inc. of San Jose, Calif., USA. However, in other embodiments, merchant server 150 may be maintained by or include another merchants and online retailers, which may provide item sales and delivery. Moreover, in various embodiments, one or more of the applications, processes, and/or features discussed below in reference to merchant server 150 may be included in shipping provider server 170 (e.g., packaging application 160 and/or shipping application 172), and vice versa.

Merchant server 150 of FIG. 1 includes a sales application 152, a packaging application 160, other applications 154, a database 156, and a network interface component 158. Sales application 152, packaging application 160, and other applications 154 may correspond to processes, procedures, and/or applications, for example, a software program, executable by a hardware processor. In other embodiments, merchant server 150 may include additional or different software as required, such as a check-in application, which may provide a check-in for user device 110 when user device 110 connects to wireless beacon 132.

Sales application 152 may also be utilized to, for example, provide a sales and/or marketplace interface permitting user 102 to browse items for sale from a merchant corresponding to merchant server 150. In this regard, sales application 152 includes one or more processes and/or features to transmit the interface over network 180 to user device 110 for display to user 102, for example, using browser application 120. The interface may enable user 102 to view items for sale from the merchant and select one or more items for purchase. After selecting items for purchase, sales application 152 may be utilized to complete a transaction for the selected item(s), for example, by providing one or more payment instruments to merchant server 150. In various embodiments, the payment instrument may correspond to a payment account provided by a payment service provider, such as PAYPAL®, Inc. of San Jose, Calif. Once the payment instrument is processed, the financial transaction may be completed.

During or after completion of the financial transaction for the one or more items, user 102 may provide shipping and recipient information for the purchased item(s). The shipping information may correspond to an address for delivery of the item(s). The item(s) may be shipped in package 130, as will be explained in more detail herein. Thus, the address may correspond to an address for user 102 (e.g., home, work, etc.) or may correspond to an address of another user receiving package 130 (e.g., a friend receiving a present from user 102). Recipient information may correspond to information provided of one or more eligible receivers for package 130, such as information identifying user 102 and other users that user 102 designates as eligible to receive package 130. The recipient information may include names, phone numbers, email addresses, identifiers, or other identification information enabling identification of the users. The shipping information may also be used to determine the recipient information. Sales application 152 may also determine whether trusted users may receive package 130 and a relational or trust score threshold for the users and/or their user devices. Sales application 152 may receive a designation to allow trusted users to receive the package or may make the determination based on policies (e.g., business rules of the merchant, such as insurance policies and/or customer service policies). The threshold score may correspond to insurance policies for the merchant, coverage, etc. Once the recipient information is determined, it may be stored to wireless beacon 132 by packaging application 160, or may be provided to another entity making the determination of whether user 102 is entitled to receive package 130.

Packaging application 160 may correspond to an application used by merchant server 150 to package and ship package 130. In various embodiments, packaging application 160 may work with shipping provider server 170 to arrange for pickup, shipping, and delivery of package 130. Packaging application 160 may receive the item(s) for delivery to user 102 and arrange for package 130 to package the items and initiate shipping of the items. Thus, packaging application 160 may determine and arrange for creation of package 130 containing the items. Once the items have been selected and are ready for packaging, packaging application 160 may further arrange for utilizing wireless beacon 132 with package 130. In this regard, packaging application 160 may have a wireless beacon placed into package 130, attached to package 130, and/or otherwise connected or corresponding to package 130. Packaging application 160 may program wireless beacon 132 with the recipient information from sales application 152, such as by storing the recipient information to a database of wireless beacon 132. In other embodiments, packaging application 160 may provide the recipient information to the entity or party making the determination of whether user 102 is eligible to receive package 130, such as delivery person device 140 and/or shipping provider server 170. As previously discussed, packaging application 160 may also provide access information for wireless beacon 132 to user 102 for reuse of the beacon. In other embodiments, such access information may be provided by shipping provider server 170.

In various embodiments, merchant server 150 includes other applications 154 as may be desired in particular embodiments to provide features to merchant server 150. For example, other applications 154 may include security applications for implementing server-side security features, programmatic server applications for interfacing with appropriate application programming interfaces (APIs) over network 180, or other types of applications. Other applications 154 may contain software programs, executable by a processor, including a graphical user interface (GUI), configured to provide an interface to a user.

Additionally, merchant server 150 includes database 156. User 102 may establish one or more purchase and payment accounts with merchant server 150. User accounts in database 156 may include user information, such as name, address, birthdate, payment/funding information, additional user financial information, and/or other desired user data. The user account information may be used to determine recipient information transmitted to another entity. In other embodiments, user 102 may link to their respective account through a user and/or device identifier. Thus, when an identifier is transmitted to merchant server 150 (e.g. from wireless beacon 132), an account belonging to user 102 may be found. In other embodiments, user 102 may not have previously established an account and may provide other identification information to merchant server 150, as previously discussed. Database 156 may further include identification information, shipping information, and/or recipient information utilized by one or more of sales application 152 and/or packaging application 160.

In various embodiments, merchant server 150 includes at least one network interface component 158 adapted to communicate with user device 110, wireless beacon 132, delivery person device 140, and/or shipping provider server 170 over network 180. In various embodiments, network interface component 158 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Shipping provider server 170 may be maintained, for example, by an online payment service provider, which may provide pickup, shipping, and delivery services for one or more items purchased from merchant server 150. In this regard, shipping provider server 170 includes one or more processing applications which may be configured to interact with user device 110, wireless beacon 132, merchant server 150, and/or delivery person device 140 to facilitate the pickup, shipping, and delivery of the item(s). Shipping provider server 170 may be maintained by or include a merchant, marketplace provider, financial services provider, and/or other service provider, which may provide shipping services to user 102 and/or the merchant corresponding to merchant server 150 (e.g., through delivery person 104). In various embodiments, one or more of the applications, processes, and/or features discussed below in reference to shipping provider server 170 may be included in merchant server 150, and vice versa.

Shipping provider server 170 of FIG. 1 includes a shipping application 172, other applications 174, a database 176, and a network interface component 178. Shipping application 172 and other applications 174 may correspond to processes, procedures, and/or applications, for example, a software program, executable by a hardware processor. In other embodiments, shipping provider server 170 may include additional or different software as required.

Shipping application 172 may be configured to receive information from merchant server 150 used for delivery of package 130 and arrange for shipping and delivery of package 130. In this regard, shipping application 172 may receive shipping instructions and/or information from merchant server 150 and arrange for pickup, shipping, and/or delivery of package 130 using the shipping information. The shipping information may include a name and address for delivery of package 130. Shipping application 172 may also receive recipient information, which may be utilized with wireless beacon 132 and/or delivery person device 140 to determine is user 102 is eligible to receive package 130. Shipping information and/or recipient information may be provided to delivery person device 140 so that delivery person 104 may deliver package 130. In various embodiments, the shipping information and/or recipient information may be entered and/or determined by shipping application 172, which may be transmitted to wireless beacon 132, delivery person device 140, and/or merchant server 150 for use in making a determination of whether user 102 may receive package 130. In such embodiments, a shipping provider corresponding to shipping provider server 170 may provide wireless beacon 132 used with package 130 (e.g., may place wireless beacon 132 in package 130 when package 130 is arranged at a location for the shipping provider).

As previously discussed, access information for reuse of wireless beacon 132 may be provided by shipping application 172 to user 102 (e.g., determined by shipping application 172 and placed into package 130 by the shipping provider or electronic transmitted to user device 110). Thus, shipping application 172 may further be utilized to clear previous recipient information for wireless beacon 132 (and thus package 130) and enter new recipient information. Shipping application 172 may receive the access information and enable user 102 to view and erase the previous recipient information for wireless beacon 132. The previous recipient information may be erased from wireless beacon 132, or from merchant server 150/shipping provider server 170. User 102 may then utilize browser application 120 with shipping application 172 to enter new recipient information for a new package user 102 wishes to ship. Thus, shipping application 172 may provide a user interface enabling user 102 to enter access information and/or new recipient information. After entering new recipient information, shipping application 172 may verify the new recipient information again for shipping information of the new package delivery and/or authorize the new recipient information with user 102. Shipping application 172 may then transmit the new recipient information for storage by the entity that will determine if the next recipient is eligible to receive the new package. The recipient information may be stored by wireless beacon 132, for example, transmitted over network 180 to user device 110 and/or wireless beacon 132 to store on wireless beacon 132, or may be store by shipping provider server 170.

In various embodiments, shipping provider server 170 includes other applications 174 as may be desired in particular embodiments to provide features to shipping provider server 170. For example, other applications 174 may include security applications for implementing server-side security features, programmatic server applications for interfacing with appropriate application programming interfaces (APIs) over network 180, or other types of applications. Other applications 174 may contain software programs, executable by a processor, including a graphical user interface (GUI), configured to provide an interface to a user.

Additionally, shipping provider server 170 includes database 176. As previously discussed, user 102 and/or merchant server 150 may establish one or more shipping accounts with shipping provider server 170. User accounts in database 176 may include merchant/user information, such as name, address, birthdate, payment/funding information, additional user financial information, and/or other desired user data. User 102 and/or the merchant may link to their respective payment accounts through a user, merchant, and/or device identifier. The user accounts may be used when shipping an item, such as through payment of shipping costs and/or determination of identification and/or recipient information. Database 176 may further include additional information, such as recipient information used to determine if user 102 is eligible to receive package 130.

In various embodiments, shipping provider server 170 includes at least one network interface component 178 adapted to communicate with user device 110, wireless beacon 132, delivery person device 140, and/or merchant server 170 over network 180. In various embodiments, network interface component 178 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2:
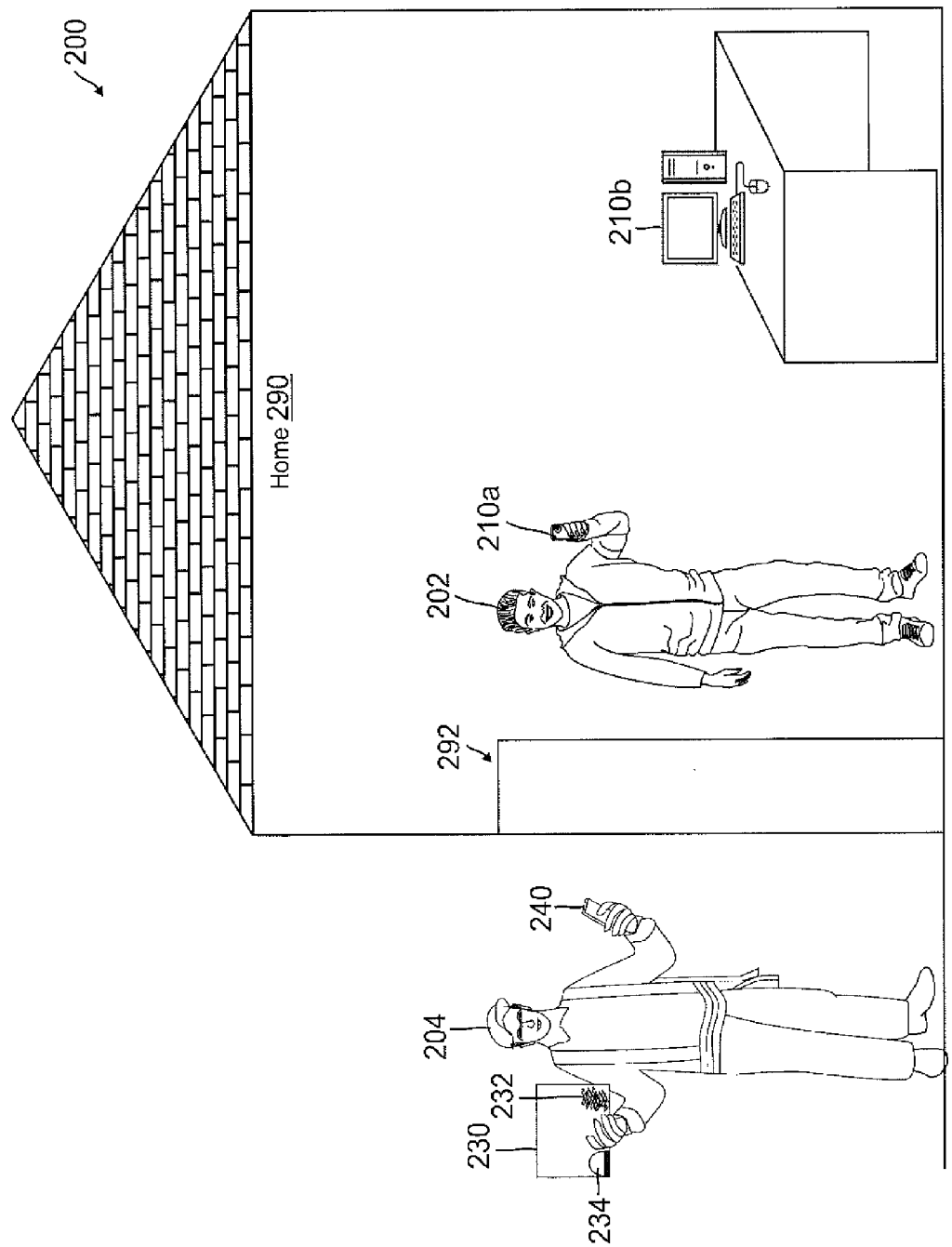
FIG. 2 is an exemplary environment showing a delivery person delivering a package including a wireless beacon to a user, according to an embodiment.

FIG. 2 is an exemplary environment showing a delivery person delivering a package including a wireless beacon to a user, according to an embodiment. Environment 200 of FIG. 2 includes a user 202 having a user device 210a and a user device 210b corresponding generally to user 102 having user device 110, respectively, of FIG. 1. Additionally, environment 200 includes a package 230 having a wireless beacon 232 and a delivery person 204 having a delivery person device 240 corresponding generally to package 130 having wireless beacon 132 and delivery person 104 having delivery person device 140, respectively, of FIG. 1.

In environment 200, user 202 is located at a home 290, such as a place user 102 receives deliveries of packages. While at home 290, user 202 may previously have ordered an item 234 for delivery, for example using user device 210a/210b. Once delivery person 204 has brought package 230 having item 234 to home 290 for delivery, user 202 may greet delivery person 204 at an entrance 292 and utilize user device 210a to perform delivery confirmation for package 230. Once user device 210a is within range of wireless beacon 232, user device 210a and wireless beacon 232 may connect and identification information for user 202 and/or user device 210a may be transmitted to wireless beacon 232.

The identification information for user 202/user device 210a may be compared to recipient information for package 230, as previously discussed. A determination of whether user 202 may receive package 230 may be made using the identification information and the recipient information. Once the determination is made (e.g., by wireless beacon 230, delivery person device 240, and/or another server), delivery person 204 may view the determination and/or notifications based on the determination using delivery person device 240. Thus, delivery person device 240 may display to delivery person 204 whether deliver person 204 should release package 230 to user 202. If the determination indicates delivery person 204 can release package 230, then delivery person 204 may relinquish package 230 to user 202. However, if the determination is that user 202 may not receive package 230, then delivery person 204 may return later with package 230 or return package 230 to the shipping party. In certain embodiments, a relational score of trusted devices may be determined using the identification information and the recipient information. If the relational score exceeds a threshold, package 230 may be given to user 202. However, if the relational score is below the threshold, delivery person 204 may either not release package 230 or may require further identification and/or verification by user 202.

After receiving package 230, user 202 may open package 230 to retrieve item 234 that user 202 has ordered. Additionally, package 230 contains wireless beacon 232 that user 202 may recover for reuse. Package 230 may further contain access information for wireless beacon 232, which may enable user 202 to reset the recipient information for wireless beacon 232. User 202 may then utilize user device 210b to reset the recipient information for wireless beacon 232, as will be explained in more detail with respect to FIG. 3B.

Figure 3A:
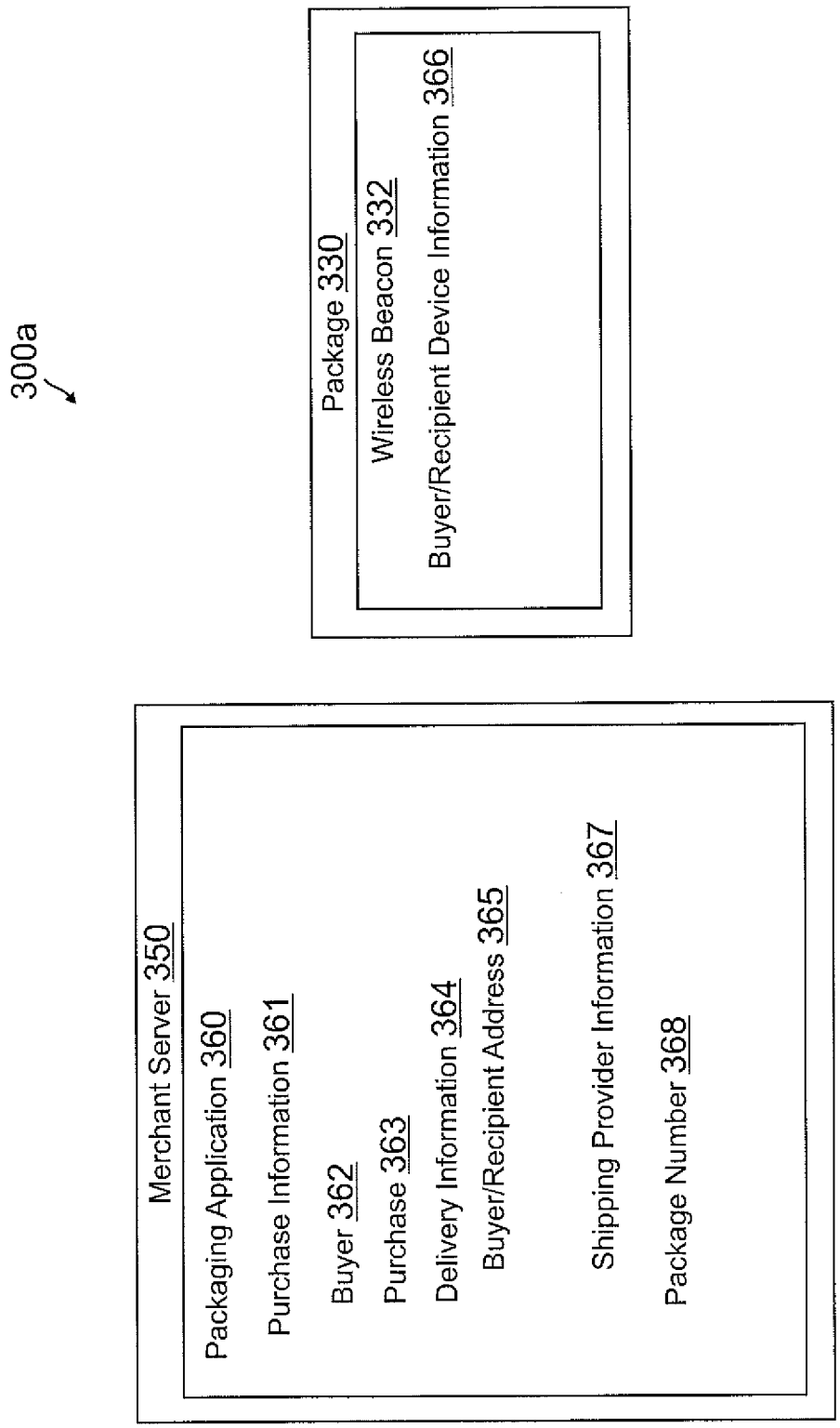
FIG. 3A is an exemplary system environment having a merchant server storing recipient information on a wireless beacon, according to an embodiment.

FIG. 3A is an exemplary system environment having a merchant server storing recipient information on a wireless beacon, according to an embodiment. Environment 300 of FIG. 3 includes a package 330, a wireless beacon 332, and a merchant server 350 corresponding generally to package 130, wireless beacon 132, and merchant server 150, respectively, of FIG. 1.

Merchant server 350 of FIG. 3A includes a packaging application 360 corresponding generally to the described features and processes of packaging application 160 of FIG. 1. Packaging application 360 may be utilized to set recipient information for wireless beacon 332 and/or store the recipient information to wireless beacon 332. Packaging application 360 includes purchase information 361, which may be received from a sales application and utilized to determine shipping and recipient information. Thus, purchase information 361 includes a buyer 362, a purchase 363, delivery information 364, and a package number 368. Buyer 362 may correspond to a name, identifier, or other information identifying a person as a purchaser of one or more items. Buyer 362 may be received from information input when purchasing an item. Purchase 363 may include purchase information, such as an item and/or service that a user has purchased for delivery.

Delivery information 364 includes buyer/recipient address 365, buyer/recipient device information 366, and shipping provider information. Delivery information 364 may be input on checkout for purchase 363. Buyer/recipient address 365 may correspond to an address that buyer 362 has input on checkout, such as their own address or the address of a recipient receiving purchase 363 (e.g., a gift for another user). Buyer/recipient device information 366 may include identification information enabling a device to determine recipient information. Shipping provider information 367 may include a shipping provider and information for the shipping provider, such as delivery type, cost, etc. Purchase information 361 further includes package number 368, which may be used by merchant server 350 for identification of package 330.

Package 330 includes wireless beacon 332 which may be programmed with buyer/recipient device information 366 from packaging application 360. As previously discussed, in other embodiments, different information may be used as recipient information (e.g., a user identifier). Moreover, a different device/server may also hold the recipient information. Wireless beacon 332 may utilize buyer/recipient device information 366 to determine if a user's device connected to wireless beacon 332 enables the user to receive package 330.

Figure 3B:
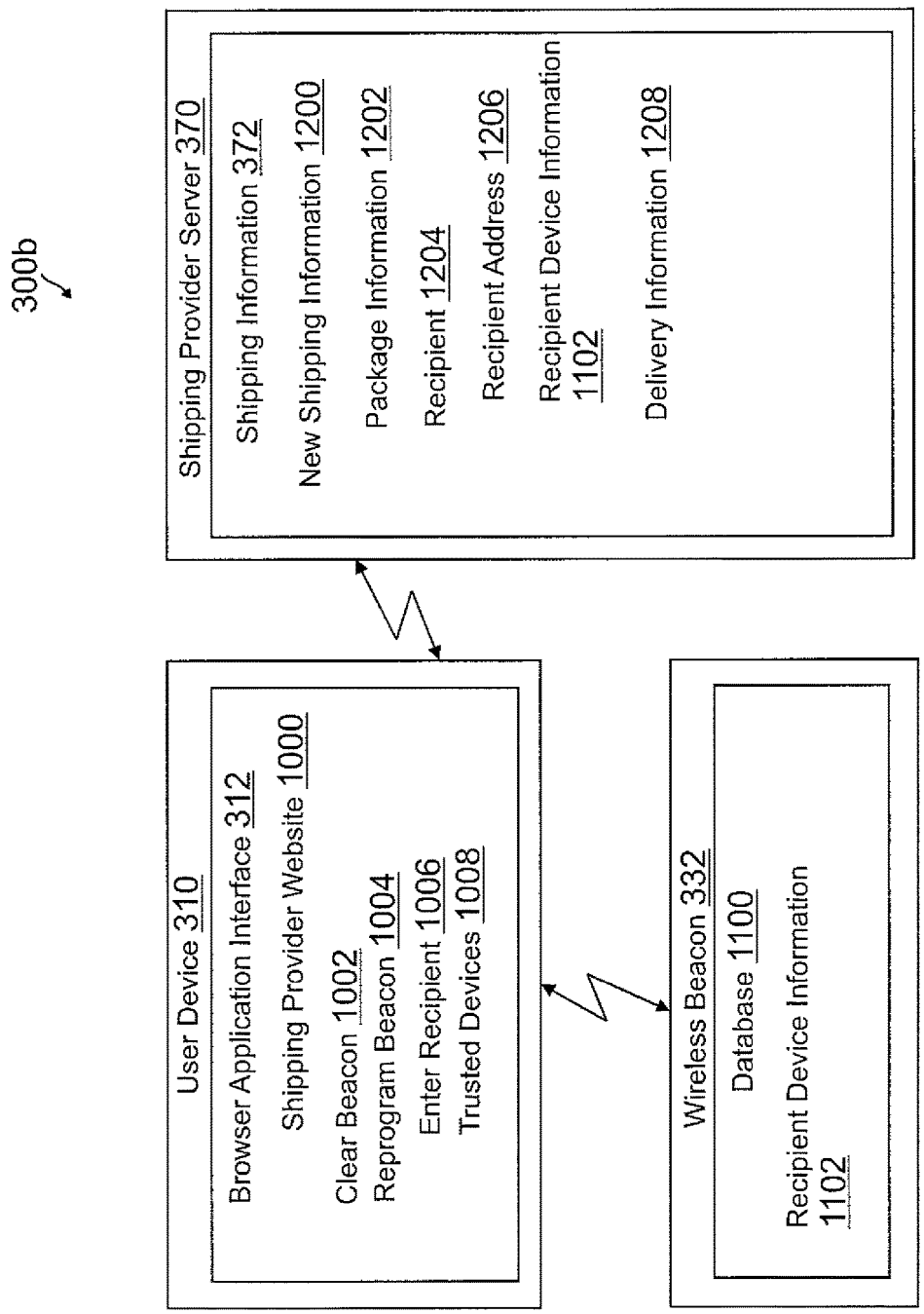
FIG. 3B is an exemplary system environment having a user device storing new recipient information to a wireless beacon, according to an embodiment.

FIG. 3B is an exemplary system environment having a user device storing new recipient information to a wireless beacon, according to an embodiment. Environment 300 of FIG. 3 includes a user device 310, a wireless beacon 332, and a shipping provider server 370 corresponding generally to user device 110, wireless beacon 132, and shipping provider 170, respectively, of FIG. 1.

FIG. 3B shows user device 310 resetting recipient information initially stored to wireless beacon 332 in FIG. 3A with new recipient information. Thus, user device 310 shows a browser application interface 312 having a shipping provider website 1000 where a user of user device 310 may reset the recipient information. Shipping provider website 1000 has a clear beacon 1002 option to erase recipient information, which may require access information to utilize. Once the user has cleared the beacon of previous recipient information, the user may utilize a reprogram beacon 1004 where the user may enter new recipient information under enter recipient 1006 and trusted devices 1008. Trusted devices 1008 may further include devices trusted for receipt of a new package containing wireless beacon 332. Moreover, trusted devices 1008 may also include information enabling an entity to determine if a device is a trusted device. For example, a user receiving a package (e.g., User X) may have a device with a specific UUID known and entered to trusted devices 1008. User X may also have other devices with unknown UUIDs. Thus, trusted devices 1008 may include information enabling shipping provider website 1000 to set recipient information for wireless beacon 332 to recognize any device for User X, such as a name or identifier associated with User X. Thus, trusted devices 1008 may also be utilized to recognize devices associated with User X, enabling other devices of User X to connect to wireless beacon 332 and authorize the receipt of a package containing wireless beacon 332. The information from reprogram beacon 1002 may be transmitted to shipping provider server 270 and/or wireless beacon 332 for storage. Thus, wireless beacon 332 includes a database 1100 having recipient device information 1102.

Shipping provider server 370 may receive the new recipient information and execute a shipping application 372 that enters the new recipient information and sets shipping information for a package containing wireless beacon 332. In this regard, shipping application 372 includes new shipment information 1200 having package information 1202, recipient 1204, and delivery information 1208. Package information may include package number, weight, cost, insurance, etc. Recipient 1204 includes recipient address 1206 and recipient device information 1102. Recipient address 1206 may include an address for delivery of the package. As discussed in reference to wireless beacon 332, recipient device information 1102 may include the recipient information for eligible recipients of the package. Delivery information 1208 may include a delivery date, time, and required information.

Figure 4:
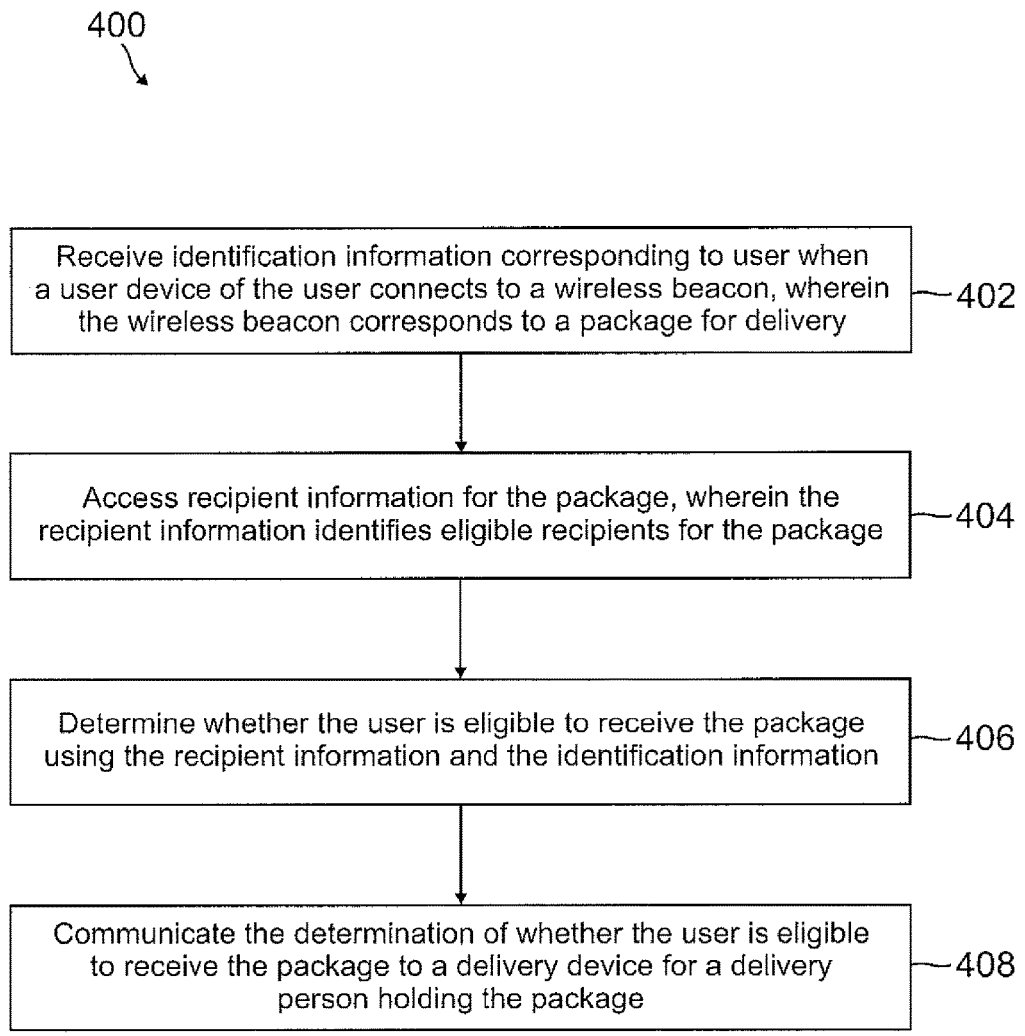
FIG. 4 is a flowchart of an exemplary process for delivery confirmation using wireless beacons, according to an embodiment.

FIG. 4 is a flowchart of an exemplary process for merchant item and service return processing using wireless beacons, according to an embodiment. Note that one or more steps, processes, and methods described herein may be omitted, performed in a different sequence, or combined as desired or appropriate.

At step 402, identification information corresponding to a user is received when a user device of the user connects to a wireless beacon, wherein the wireless beacon corresponds to a package for delivery. The user device and the wireless beacon may connect using one of near field communication, radio communication, infrared communication, Bluetooth communication, Bluetooth Low Energy (BLE) communication, WiFi communication, and LTE Direct communication. The wireless beacon may be placed inside of the package, which may further include access information for the wireless beacon. The identification information may comprise an identifier for at least one of the user and the user device.

Recipient information for the package is accessed, at step 404, wherein the recipient information identifies eligible recipients for the package. The recipient information may comprise the identification information or may comprise different identification information. In other embodiments, the recipient information may comprise a list of trusted users and devices for the package, such as identifiers for users and devices that are authorized to receive the package.

At step 406, it is determined whether the user is eligible to receive the package using the recipient information and the identification information. The determination may be based on matching the recipient information to the identification information or the list of trusted users and devices for the package. Additionally, a relation score may be determined between the user and a user in the recipient information that may be used to determine if the user may receive the package. In other embodiments, a blacklist of users ineligible to receive the package may be determined and used to determine whether the user is ineligible to receive the package. Thus, at step 408, the determination of whether the user is eligible to receive the package is communicated to a delivery device for a delivery person holding the package.

In various embodiments, recipient information for another user is received and communicated to the wireless beacon for storage. Thus, new identification information may be received when a user device for the other user connects to the wireless beacon, wherein the wireless beacon corresponds to a new package for delivery. The wireless beacon may be placed in the new package. The first user may utilize access information to erase the first recipient information and store the new recipient information to the wireless beacon.

Figure 5:
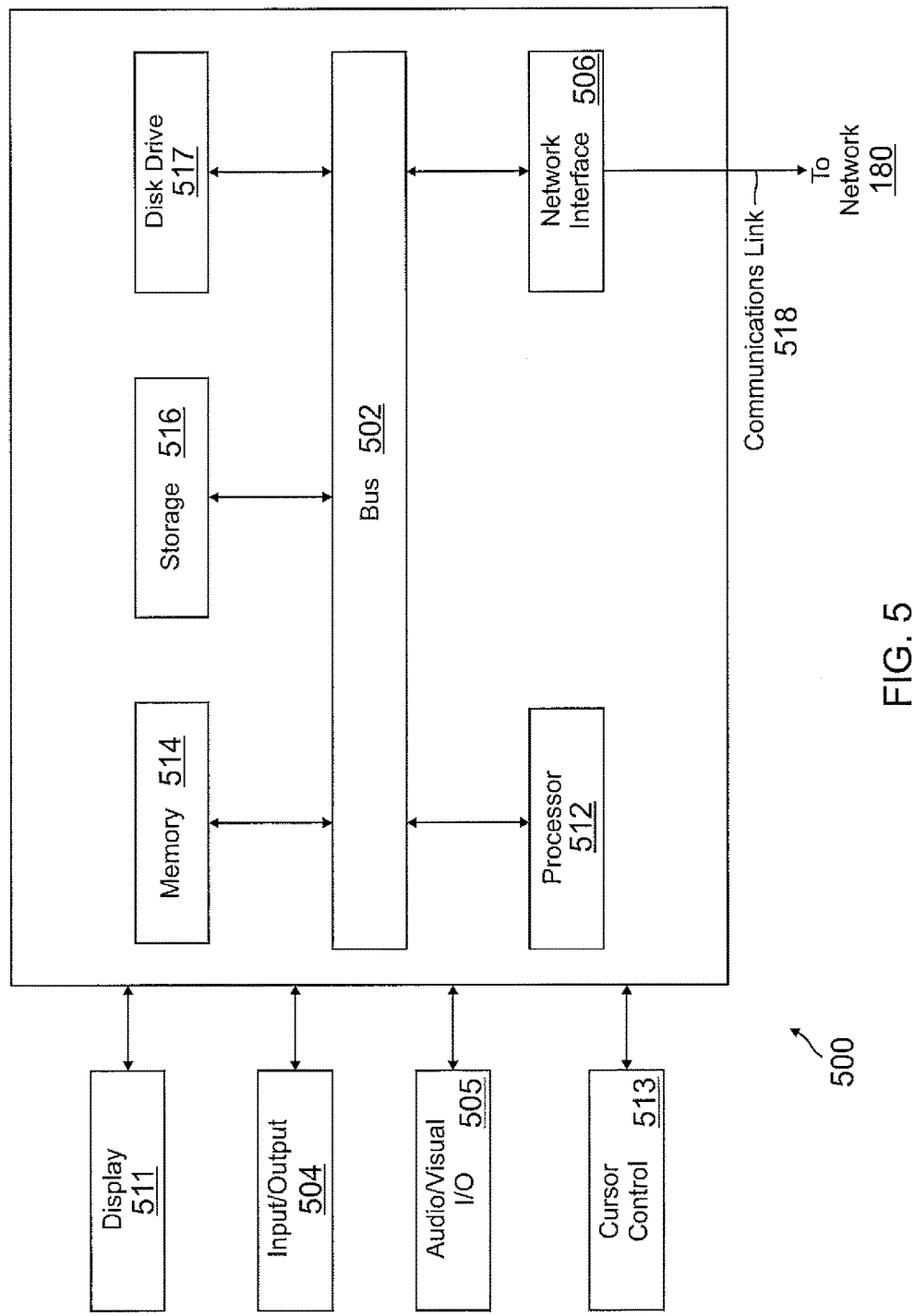
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, service device, or a service provider server via network 180. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A wireless beacon device comprising:
    a short range wireless transceiver configured to send and receive short range wireless signals over a wireless communication proximity range using a short range wireless communication protocol;
    a non-transitory memory storing recipient information for a delivery package, wherein the wireless beacon device is included with the delivery package; and
    one or more hardware processors configured to execute instructions to cause the wireless beacon device to perform operations comprising:
        receiving the recipient information for the delivery package from a merchant device for a merchant, wherein the recipient information is set by a first user during a transaction between the first user and the merchant for an item in the delivery package, and wherein the recipient information comprises data regarding release of the delivery package to a second user different from the first user;
        in response to receiving the recipient information from the merchant device, broadcasting, by the wireless beacon device in a first power mode, a digital token initiating a wake up process on a user device associated with the second user and comprising an identifier for establishing a connection with the user device, wherein the wake up process causes an application of the user device to transmit identification information to the wireless beacon device, and wherein the digital token is broadcast over the wireless communication proximity range using the short range wireless communication protocol;
        in response to the user device receiving the digital token, establishing, in a second power mode, the connection with the user device, wherein the second power mode increases power of the wireless beacon device to establish the connection;
        receiving the identification information from the user device through the connection;
        determining, by the wireless beacon device, an authorization for release of the delivery package based on the data and the identification information; and
        causing to be displayed, on a delivery device for a delivery person in possession of the delivery package, the authorization.

2. The wireless beacon device of claim 1, wherein the connection between the user device and the wireless beacon device uses one of near field communication, radio communication, infrared communication, Bluetooth communication, Bluetooth Low Energy (BLE) communication, WiFi communication, or LTE Direct communication.

3. The wireless beacon device of claim 1, wherein the identification information comprises an identifier for the user device.

4. The wireless beacon device of claim 1, wherein the recipient information comprises the identification information, and wherein the authorization permits the delivery person to release the delivery package to the second user based on the recipient information matching the identification information.

5. The wireless beacon device of claim 1, wherein the recipient information comprises second identification information, and wherein the authorization prevents the delivery person from releasing the delivery package based on the recipient information comprising the second identification information not matching the identification information.

6. The wireless beacon device of claim 1, wherein the recipient information comprises a list of trusted users and devices, and wherein the list of trusted users and devices comprises identifiers for devices that are authorized to receive the delivery package.

7. The wireless beacon device of claim 1, wherein the recipient information comprises second identification information for a third user, and wherein the operations further comprise:
    determining, by the wireless beacon device, a relational score between the identification information and the second identification information,
    wherein the authorization is further determined using the relational score.

8. The wireless beacon device of claim 7, wherein the relational score is further determined using at least one of co-locating between the identification information and the second identification information, shared user accounts between the identification information and the second identification information, or a list of designated recipients for at least one of the identification information or the second identification information.

9. The wireless beacon device of claim 1, wherein the operations further comprise:
   determining a blacklist of users not authorized to receive packages from the first user based on feedback by at least one other user, wherein the feedback comprises an unauthorized receipt of at least one other package from the first user,
   wherein the authorization is further determined using the blacklist.

10. The wireless beacon device of claim 1, wherein the recipient information is further stored on the delivery device by a shipping provider.

11. A method comprising:
   receiving, by a wireless beacon comprising a short range wireless transceiver configured to send and receive short range wireless signals using a short range wireless communication protocol, recipient information for a package from a merchant device for a merchant, wherein the recipient information is set by a first user during a transaction between the first user and the merchant on an online marketplace for an item in the package, and wherein the recipient information comprises data regarding release of the package to a second user different from the first user;
   in response to receiving the recipient information from the merchant device, broadcasting, by the wireless beacon in a first power mode, a digital token initiating a wake up process on a user device associated with the second user and comprising an identifier for establishing a wireless connection with the user device, wherein the wake up process causes an application of the user device to transmit identification information to the wireless beacon, wherein the digital token is broadcast over the short range wireless communication protocol, and wherein the wireless beacon is associated with the package for delivery;
   in response to the user device receiving the digital token, establishing, in a second power mode, the wireless connection with the user device, wherein the second power mode increases power of the wireless beacon to establish the wireless connection;
   receiving, by the wireless beacon, the identification information from the user device through the wireless connection;
   determining, using the wireless beacon, whether to release the package based on the data and the identification information; and
   causing to be displayed, by the wireless beacon on a delivery device for a delivery person in possession of the package, the determination of whether the second user is eligible to receive the package.

12. The method of claim 11 further comprising:
   receiving recipient information corresponding to a third user; and
   storing, by the wireless beacon, the recipient information corresponding to the third user.

13. The method of claim 12 further comprising:
   receiving the identification information corresponding to the third user when a user device of the third user connects to the wireless beacon, wherein the wireless beacon is associated with a second package for delivery.

14. The method of claim 13, wherein the wireless beacon is inside the second package.

15. The method of claim 12, wherein the recipient information of the second user is further stored on the delivery device from a shipping provider.

16. The method of claim 15, wherein the package includes access information to the wireless beacon.

17. The method of claim 16, wherein the access information enables the recipient information of the second user to be erased from the wireless beacon.

18. A non-transitory machine-readable medium comprising a plurality of machine-readable instructions executable to cause a machine to perform operations comprising:
   receiving, by a wireless beacon comprising a short range wireless transceiver configured to send and receive short range wireless signals using a short range wireless communication protocol, a list of trusted users entitled to receive a package from a merchant device for a merchant, wherein the list of trusted users is set by a user during a transaction between the user and the merchant on an online marketplace for an item in the package, and wherein the list comprises data regarding release of the package to another user separate from the user;
   in response to receiving the data from the merchant device, broadcasting, by the wireless beacon in a first power mode, a digital token that initiates a wake up process on a user device of the other user and comprises an identifier for establishing a connection with the user device, wherein the wake up process causes an application of the user device to transmit identification information to the wireless beacon, wherein the digital token is broadcast over the short range wireless communication protocol, and wherein the wireless beacon is associated with the package comprising the item from the transaction with the merchant;
   in response to the user device receiving the digital token, establishing, in a second power mode, the connection with the user device, wherein the second power mode increases power of the wireless beacon to establish the connection;
   receiving, by the wireless beacon, the identification information from the user device through the connection;
   determining, by the wireless beacon, an authorization to release the package based on the data and the identification information; and
   causing to be displayed, on a delivery device for a delivery person in possession of the package, an instruction to release the package to the other user.

19. The non-transitory machine-readable medium of claim 18, wherein the wireless beacon is associated with the package in response to processing the transaction.

20. The non-transitory machine-readable medium of claim 19, wherein the merchant device stores the list of trusted users on the wireless beacon for a second connection between the merchant device and the wireless beacon over a second short range wireless communication signal.

* * * * *